US011921868B2

(12) United States Patent
Arumugam Maharaja

(10) Patent No.: US 11,921,868 B2
(45) Date of Patent: Mar. 5, 2024

(54) DATA ACCESS CONTROL FOR USER DEVICES USING A BLOCKCHAIN

(71) Applicant: Bank of America Corporation, Charlotte, NC (US)

(72) Inventor: Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 351 days.

(21) Appl. No.: 17/449,857

(22) Filed: Oct. 4, 2021

(65) Prior Publication Data

US 2023/0107806 A1 Apr. 6, 2023

(51) Int. Cl.

| | |
|---|---|
| ***G06F 21/60*** | (2013.01) |
| ***G06F 16/23*** | (2019.01) |
| ***G06F 16/27*** | (2019.01) |
| ***G06F 21/62*** | (2013.01) |
| ***G06N 20/00*** | (2019.01) |

(52) U.S. Cl.

CPC ........ *G06F 21/602* (2013.01); *G06F 16/2379* (2019.01); *G06F 16/27* (2019.01); *G06F 21/6218* (2013.01); *G06N 20/00* (2019.01)

(58) Field of Classification Search

CPC .... G06F 21/602; G06F 16/27; G06F 16/2379; G06F 21/6218; G06F 21/60; G06F 21/62; G06N 20/00

See application file for complete search history.

(56) References Cited

U.S. PATENT DOCUMENTS

| | | | |
|---|---|---|---|
| 5,191,611 | A | 3/1993 | Lang |
| 5,327,497 | A | 7/1994 | Mooney et al. |
| 5,479,512 | A | 12/1995 | Weiss |
| 6,351,813 | B1 | 2/2002 | Mooney et al. |
| 6,434,535 | B1 | 8/2002 | Kupka et al. |
| 7,069,439 | B1 | 6/2006 | Chen et al. |
| 7,194,623 | B1 | 3/2007 | Proudler et al. |
| 7,200,757 | B1 | 4/2007 | Muralidhar et al. |
| 7,246,246 | B2 | 7/2007 | Kupka et al. |

(Continued)

FOREIGN PATENT DOCUMENTS

| | | | |
|---|---|---|---|
| EP | 0191162 | A2 | 8/1986 |
| EP | 0936583 | A1 | 8/1999 |

(Continued)

*Primary Examiner* — Robert B Leung
*Assistant Examiner* — Howard H. Louie

(57) ABSTRACT

A device configured to provide access to a digital document to a user device and to receive an access request for a first masked data element within the digital document. The device is further configured to generate a first blockchain transaction that identifies a machine learning model that is stored in a blockchain. The device is further configured to publish the first blockchain transaction in a blockchain ledger for the blockchain and to receive a second blockchain transaction from the machine learning model in response to publishing the blockchain transaction in the blockchain ledger. The second transaction indicates whether the user is approved for accessing the masked data element. The device is further configured to provide access to the first masked data element on the user device for the user in response to determining that the user is approved for accessing the masked data element.

20 Claims, 5 Drawing Sheets

(56) References Cited

U.S. PATENT DOCUMENTS

| | | | |
|---|---|---|---|
| 7,302,698 B1 | 11/2007 | Proudler et al. | |
| 7,353,531 B2 | 4/2008 | Brown et al. | |
| 7,761,779 B2 | 7/2010 | Kanai et al. | |
| 7,877,398 B2 | 1/2011 | Kroeschel et al. | |
| 7,974,942 B2 | 7/2011 | Pomroy et al. | |
| 8,341,104 B2 | 12/2012 | Manickam et al. | |
| 8,762,406 B2 | 6/2014 | Ho et al. | |
| 9,465,954 B1 | 10/2016 | Speedie et al. | |
| 9,621,680 B2 | 4/2017 | D'Costa et al. | |
| 9,635,000 B1 | 4/2017 | Muftic | |
| 9,680,799 B2 | 6/2017 | Iyer et al. | |
| 2002/0095405 A1 | 7/2002 | Fujiwara | |
| 2006/0074897 A1 | 4/2006 | Fergusson | |
| 2009/0049512 A1 | 2/2009 | Manickam et al. | |
| 2009/0100527 A1 | 4/2009 | Booth et al. | |
| 2015/0067886 A1 | 3/2015 | Maman | |
| 2016/0259937 A1 | 9/2016 | Ford et al. | |
| 2016/0379010 A1 | 12/2016 | Farkash et al. | |
| 2017/0132626 A1 | 5/2017 | Kennedy | |
| 2019/0236598 A1* | 8/2019 | Padmanabhan | G06Q 20/389 |
| 2022/0138550 A1* | 5/2022 | Zhang | G06N 3/063<br>706/25 |
| 2022/0138731 A1* | 5/2022 | Cheng | G06Q 30/0205<br>705/7.34 |
| 2023/0088869 A1* | 3/2023 | Maharaja | G06F 16/9024<br>707/803 |

FOREIGN PATENT DOCUMENTS

| | | |
|---|---|---|
| EP | 0973135 A2 | 1/2000 |
| EP | 0973136 A2 | 1/2000 |
| EP | 1152318 A2 | 11/2001 |
| GB | 2329499 A | 3/1999 |
| GB | 2354102 A | 3/2001 |
| GB | 2372592 A | 8/2002 |
| WO | 9306542 A1 | 4/1993 |
| WO | 9524696 A2 | 9/1995 |
| WO | 9729416 A3 | 8/1997 |
| WO | 9855911 A1 | 12/1998 |
| WO | 9855912 A1 | 12/1998 |
| WO | 9955055 A1 | 10/1999 |
| WO | 0026866 A1 | 5/2000 |
| WO | 0147210 A2 | 6/2001 |
| WO | 0205071 A2 | 1/2002 |
| WO | 02073380 A1 | 9/2002 |
| WO | 02086684 A2 | 10/2002 |
| WO | 03044637 A1 | 5/2003 |
| WO | 2009011496 A2 | 1/2009 |
| WO | 2017079214 A1 | 5/2017 |

* cited by examiner

116A

402

404, 404A 404, 404B 404, 404C 404, 404D

| GROUP | COUNTS | SCORE | CODE |
|---|---|---|---|
| GROUP 1 | 4 | 5 | XAC2 |
| GROUP 2 | 7 | # | #### |
| GROUP 3 | 3 | 5 | HGTR2 |
| GROUP 4 | 4 | 6 | YTRE2 |
| GROUP 5 | 2 | # | #### |

| GROUP | COUNTS | SCORE | CODE |
|---|---|---|---|
| GROUP 1 | 4 | 5 | XAC2 |
| GROUP 2 | 7 | 8 | PY1A |
| GROUP 3 | 3 | 5 | HGTR2 |
| GROUP 4 | 4 | 6 | YTRE2 |
| GROUP 5 | 2 | # | #### |

120

406

| MASKED DATA ELEMENT | APPROVAL | INSTRUCTIONS |
|---|---|---|
| 404A | Y | XXX |
| 404B | Y | XXX |
| 404C | N | XXX |
| 404D | N | XXX |

*FIG. 4B*

DATA ACCESS CONTROL FOR USER DEVICES USING A BLOCKCHAIN

TECHNICAL FIELD

The present disclosure relates generally to information security, and more specifically to data access control for user devices using a blockchain.

BACKGROUND

In a network environment, user devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as user devices, databases, and servers, are vulnerable to attacks. This vulnerability poses several network security challenges. Existing systems are typically unable to detect a network attack until after the attack has occurred. For example, a bad actor may upload malicious files to a device which then allows the bad actor to gain unauthorized access to other files or documents that are also stored in the device. Having a delayed response allows the bad actor to gain access to sensitive information within the network and allows bad actors to perform other malicious activities such as data exfiltration or uploading malware.

Conventional systems use an all-or-nothing approach for providing access control to data. User devices within a network are typically pre-configured with general permission settings that limit the types of data that a user has access to. Since networks may include a large number of devices, existing systems are unable to provide personalized permission settings for each device without consuming a significant amount of processing resources when configuring the permission settings for each device. Over time, permission settings may need to be frequently adjusted which places an additional strain on the number of processing resources that are available for other processes. This overconsumption of processing resources reduces the system's ability to perform other operations and reduces the throughput of the system which degrades the overall performance of the system.

SUMMARY

The disclosed system provides several practical applications and technical advantages that overcome the previously discussed technical problems. For example, the disclosed system provides a practical application by providing access to digital documents for a user device and allowing a user associated with the user device to request access to any masked data elements within the digital document. A masked data element is a data element that has values that are not visible or accessible to a user. The disclosed system is configured to make dynamic access control decisions for the user device based on the user associated with the user device and the content of the masked data element. This process allows an information system to determine whether or not granting access to masked data elements for a user will compromise the integrity and security of the information system and its resources. The disclosed system employs a machine learning model that is stored within a blockchain to provide access control data for user devices in a network, which improves information security and the efficiency of the information system. This process generally involves receiving an access request for a masked data element within a digital document and generating a blockchain transaction that comprises information identifying a user and the masked data element. After generating the blockchain transaction, the information system publishes the blockchain transaction to a blockchain that includes a machine learning model. The machine learning model is pre-configured to obtain information associated with the user and to determine whether the user is authorized to access the masked data element based on the obtained information. The machine learning model is further configured to publish a blockchain transaction to the blockchain that indicates whether the user is authorized to access the masked data element. The information system will then either grant or deny access to the masked data element for the user based on the response from the machine learning model. This process improves the operation of the system by offloading the access control logic to the machine learning model which is stored in the blockchain. This process provides a technical improvement that allows the information system to provide personalized permission settings while consuming fewer processing resources when determining whether to adjust permission settings for a user device. In other words, this process improves the operation of the information system by improving resource utilization which in turn improves the throughput and the overall operation of the information system.

Using the blockchain provides improved information security for the information system. For example, by employing the blockchain, the information system is able to audit and verify the access privileges that are granted to a user. The blockchain is implemented using a distributed ledger that makes modifying the data within the blockchain difficult for a bad actor. In addition, the information in the blockchain is accessible to any device with a copy of the blockchain ledger, which allows the data in the blockchain to be verified at any time. This means that the information system is able to record the access privileges that have been granted to a user at any time. This information can be verified at any time (e.g. in real-time) to ensure that a user has permission to access certain data elements. This feature provides a technical advantage over existing systems that store information in a centralized location (e.g. a server or database) that is susceptible to attacks and hardware malfunctions.

Improving information security for the information system also improves the underlying network and the devices within the network. For example, when a data exfiltration attack occurs, there is an increase in the number of network resources and bandwidth that are consumed which reduces the throughput of the network. By preventing data exfiltration attacks, the system can prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In one embodiment, the information system comprises a device that is configured to provide access to a digital document to a user device and to receive an access request for a first masked data element within the digital document. The device is further configured to generate a first blockchain transaction that identifies a machine learning model that is stored in a blockchain. The device is further configured to publish the first blockchain transaction in a blockchain ledger for the blockchain and to receive a second blockchain transaction from the machine learning model in response to publishing the blockchain transaction in the blockchain ledger. The second transaction indicates whether the user is approved for accessing the masked data element. The device is further configured to provide access to the first masked data element on the user device for the user in response to determining that the user is approved for accessing the masked data element.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 4A is an example of a digital document with masked data elements;

FIG. 4B is an example of a digital document after recovering a masked data element;

DETAILED DESCRIPTION

Information System Overview

Figure 1:
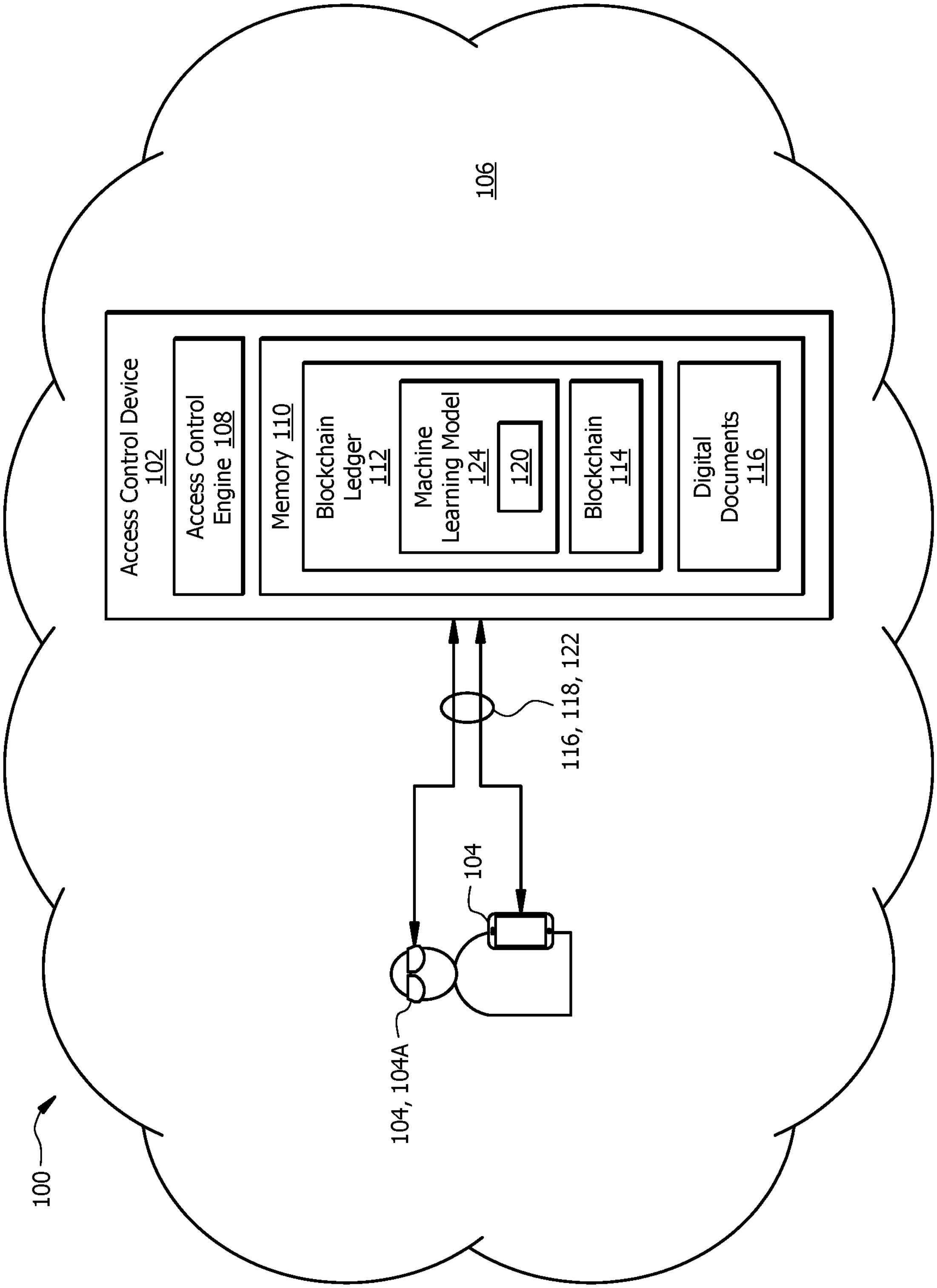
FIG. 1 is a schematic diagram for an information system configured to use a blockchain for access control.

FIG. 1 is a schematic diagram of an embodiment of an information system 100 that is generally configured to provide access to digital documents 116 for a user device 104 and to allow a user associated with the user device 104 to request access to any masked data elements 404 within the digital document 116. A masked data element 404 is a data element 402 that has values that are not visible or accessible to a user. For example, a data element 402 may be converted into a masked data element 404 by obfuscating, encrypting, or hiding the data element 402 within the digital document 116. Masking the data element 402 prevents the user from identifying any values that are associated with the data element 402. When the information system 100 receives a request to access a masked data element 404, the information system 100 is configured to generate a blockchain transaction 204 that identifies a user and the masked data element 404. The information system 100 is further configured to publish the blockchain transaction 204 into a blockchain 114 that comprises a machine learning model 124 that is configured to determine whether the user is authorized to access the masked data element 404. The information system 100 is configured to either grant or deny access to the masked data element 404 based on the response from the machine learning model 124. This process allows the information system 100 to offload some of the access control logic to the machine learning model 124 which is configured to dynamically determine whether a user is authorized to access masked data elements 404 based on various types of information that are associated with the user.

Using the blockchain 114 provides information security and the ability to audit and verify the access privileges that are granted to the user. The blockchain 114 is implemented using a distributed ledger (e.g. blockchain ledger 112) that makes modifying the data within the blockchain 114 difficult for a bad actor. In addition, the information in the blockchain 114 is accessible to any device with a copy of the blockchain ledger 112, which allows the data in the blockchain 114 to be verified at any time. This means that the information system 100 is able to record the access privileges that have been granted to a user at any time. This information can be verified at any time (e.g. in real-time) to ensure that a user has permission to access certain data elements.

In one embodiment, the information system 100 comprises a plurality of user devices 104 and an access control device 102 that are in signal communication with each other within a network 106. The access control device 102 may also be in signal communication with other network devices within the network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

User Devices

A user device 104 is generally configured to provide hardware and software resources to a user. Examples of the user device 104 include, but are not limited to, a smartphone, a tablet, a laptop, a computer, a smart device, an augmented reality device, a virtual reality device, or any other suitable type of device. The user device 104 comprises a graphical user interface (e.g. a display or a touchscreen) that allows a user to view digital documents 116 on the user device 104. The user device 104 may comprise a touchscreen, a touchpad, keys, buttons, a mouse, or any other suitable type of hardware that allows a user to provide inputs into the user device 104. The user device 104 is configured to allow the user to view digital documents 116 and to request access to masked data elements 404 within the digital document 116. Examples of digital documents 116 include, but are not limited to, text files, tables, charts, presentations, images, files, documents, or any other suitable type of digital data. An example of a digital document 116 with masked data elements 404 is described in FIG. 4A. An example of a user device 104 performing this process is described in FIG. 3.

In some embodiments, the user device 104 may be an augmented reality device 104A. In FIG. 1, the augmented reality device 104A is configured as a head-mounted wearable device. In other examples, the augmented reality device 104A may be integrated into a contact lens structure, an eyeglass structure, a visor structure, a helmet structure, or any other suitable structure. An example of the hardware configuration of the augmented reality device 104A is described in FIG. 6.

Access Control Device

Examples of an access control device 102 include, but are not limited to, a server, an access point, a computer, or any other suitable type of network device. In one embodiment, an access control device 102 comprises an access control engine 108 and a memory 110. Additional details about the hardware configuration of the access control device 102 are described in FIG. 5. The memory 110 is configured to store digital documents 116, blockchain ledgers 112, machine learning models 124, blockchains 114, and/or any other suitable type of data.

In one embodiment, the access control engine 108 is generally configured to provide access to digital documents 116 for user device 104. Providing access to the digital documents 116 allows a user to view, interact, and modify data elements 402 (e.g. data fields, text, graphs, tables, etc.) within digital documents 116 using their user device 104. The access control engine 108 is further configured to receive requests for accessing data elements 402 that are masked within the digital document 116. In response to receiving a request 118 for access to a data element 402 that is masked (i.e. a masked data element 404), the access control engine 108 is further configured to generate a blockchain transaction 204 that comprises information associated with a user and a masked data element 404 and to publish the blockchain transaction 204 into a blockchain 114 that comprises a machine learning model 124. The machine learning model 124 is configured to determine whether the user is authorized to access the masked data element 404. In response to publishing the blockchain transaction 204, the access control engine 108 receives a blockchain transaction 204 from the machine learning model 124 that indicates whether the user is approved to access the masked data element 404. The access control engine 108 is further configured to provide access to the masked data element 404 or to restrict access to the masked data element 404 based on the response from the machine learning model 124. An example of the access control engine 108 performing this operation is described in more detail in FIG. 3.

Examples of machine learning models 124 include, but are not limited to, a multi-layer perceptron, a recurrent neural network (RNN), an RNN long short-term memory (LSTM), a convolutional neural network (CNN), or any other suitable type of neural network model. Additional details about the machine learning model 124 are described in FIGS. 2-3. In one embodiment, the machine learning model 124 is generally configured to receive a masked data element identifier and a user identifier as an input and to publish a blockchain transaction 204 based on the provided input. The machine learning model 124 is configured to generate and publish a blockchain transaction 204 that comprises an access response that indicates whether the user associated with the user identifier is approved for accessing a data element 402 that is associated with masked data element identifier. The machine learning model 124 may be configured to determine whether the user is approved to access the masked data element 404 based on the masked data element identifier, the user identifier, user behavior history associated with the user, a group identifier for a group associated with the user, behavior history for a group associated with the user, or any other suitable type or combination of information.

In some embodiments, the access response may comprise machine-executable instructions 406. As an example, the access response may comprise machine-executable instructions 406 for modifying a digital document 116 to provide access to a masked data element. For instance, the machine-executable instructions 406 may comprise an encryption key for deobfuscating or decrypting a masked data element 404. As another example, the access response may comprise machine-executable instructions 406 for modifying permission settings on the user device 104 for the user. The permission settings may comprise network settings, security settings, hardware settings, software settings, any other suitable type or combination of settings for the user device 104.

The machine learning model 124 is trained using training data that comprises different types of user information, group information, data element information, and/or any other suitable type of information. During the training process, the machine learning model 124 determines weights and bias values that allow the machine learning model 124 to identify either an approval or denial message based on the information that is input to the machine learning model 124. Through this process, the machine learning model 124 is able to determine whether a user is approved to access a masked data element 404 based on the information input into the machine learning model 124. The access control engine 108 may be configured to train the machine learning models 124 using any suitable technique as would be appreciated by one of ordinary skill in the art. In some embodiments, machine learning models 124 may be stored and/or trained by a device that is external from the access control device 102.

Blockchain with a Machine Learning Model Overview

Figure 2:
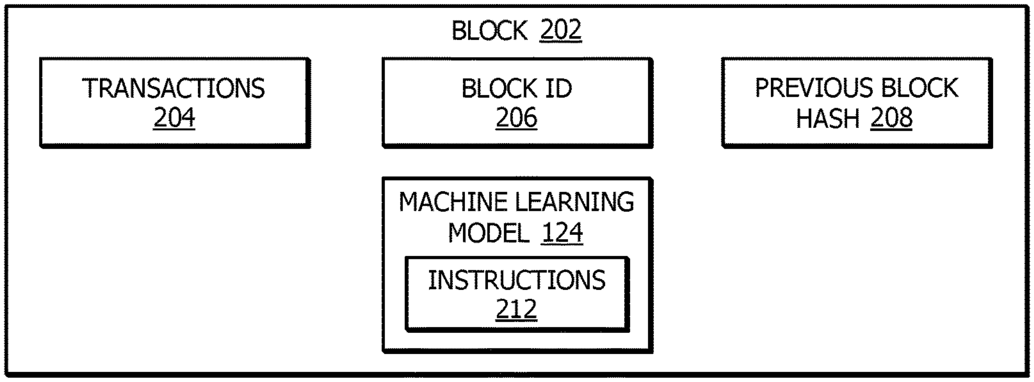
FIG. 2 is an example of a block from the blockchain with a machine learning model.

FIG. 2 illustrates an embodiment of a block 202 from the blockchain 114. A blockchain 114 generally refers to a database shared by a plurality of devices or network nodes in a network. The information system 100 may employ any suitable number of devices (e.g. access control devices 102) to form part of a distributed network that maintains the blockchain 114. Each network node comprises a blockchain ledger 112 that is configured to store a copy of the blockchain 114, which contains every blockchain transaction 204 executed in the network. The blockchain 114 links together blocks 202 of data which comprise identifiable units called blockchain transactions 204. Blockchain transactions 204 may comprise information, files, or any other suitable type of data. For example, a blockchain transaction 204 may comprise information associated with access control requests, digital documents, user information, access control request response, or any other type of information.

Each block 202 in the blockchain 114 comprises a block identifier 206 and information derived from a preceding block 202. For example, every block 202 in the blockchain 114 includes a hash 208 of the previous block 202. By including the hash 208, the blockchain 114 comprises a chain of blocks 202 from a genesis block 202 to the current block 202. Each block 202 is guaranteed to come after the previous block 202 chronologically because the previous block's hash 208 would otherwise not be known. In one embodiment, blocks 202 in a blockchain 114 may be linked together by identifying a preceding block 202 with a cryptographic checksum (e.g. secure hash algorithm (SHA)-256) of its contents (e.g. blockchain transactions 204 and additional metadata) which serves as each block's unique identifier. Links are formed by storing the cryptographic checksum identifier of one block 202 in the metadata of another block 202, such that the former block 202 becomes the predecessor of the latter block 202. In this way, the blocks 202 form a chain that can be navigated from block-to-block by retrieving the cryptographic checksum of a particular block's predecessor from the particular block's own metadata. Each block 202 is computationally impractical to modify once it has been in the blockchain 114 because every block 202 after it would also have to be regenerated. These features protect data stored in the blockchain 114 from being modified by bad actors which provides information security. When a network node publishes an entry (e.g. one or more transactions 204 in a block 202) in its blockchain ledger 112, the blockchain 114 for all other network nodes in the distributed network is also updated with the new entry. Thus, data published in a blockchain 114 is available and accessible to every network node with a blockchain ledger 112. This allows the data stored in the block 202 to be accessible for inspection and verification at any time by any device with a copy of the blockchain ledger 112.

Some blocks 202 may comprise one or more machine learning models 124. The machine learning models 124 are configured as described in FIG. 1. The machine learning models 124 comprise computer-executable code, script, or instructions 212 that are configured to execute when a set of inputs are received by the machine learning model 124. The machine learning model 124 is configured to receive messages or information from other devices (e.g. access control device 102) and to use the received input to determine whether or not to provide access to a data element 402 for a user. The machine learning model 124 and the instructions 212 may be written C++, C#, Go, Python, Java, extensible markup language (XML) script, or any other suitable programming language.

The instructions 212 may be configured with instructions for performing any specified operations. For example, the instructions 212 may be configured to receive a masked data element identifier for a masked data element 404 in a digital document 116 and a user identifier for a user and to publish a blockchain transaction 204 in the blockchain ledger 112 based at least in part on the masked data element identifier and the user identifier. The published blockchain transaction 204 comprises an access response that indicates whether the user is approved for accessing a data element 402 associated with the masked data element 404 in the digital document 116. In other embodiments, the instructions 212 may comprise any other suitable type and combination of executable instructions for performing other types of operations.

Data Access Process

Figure 3:
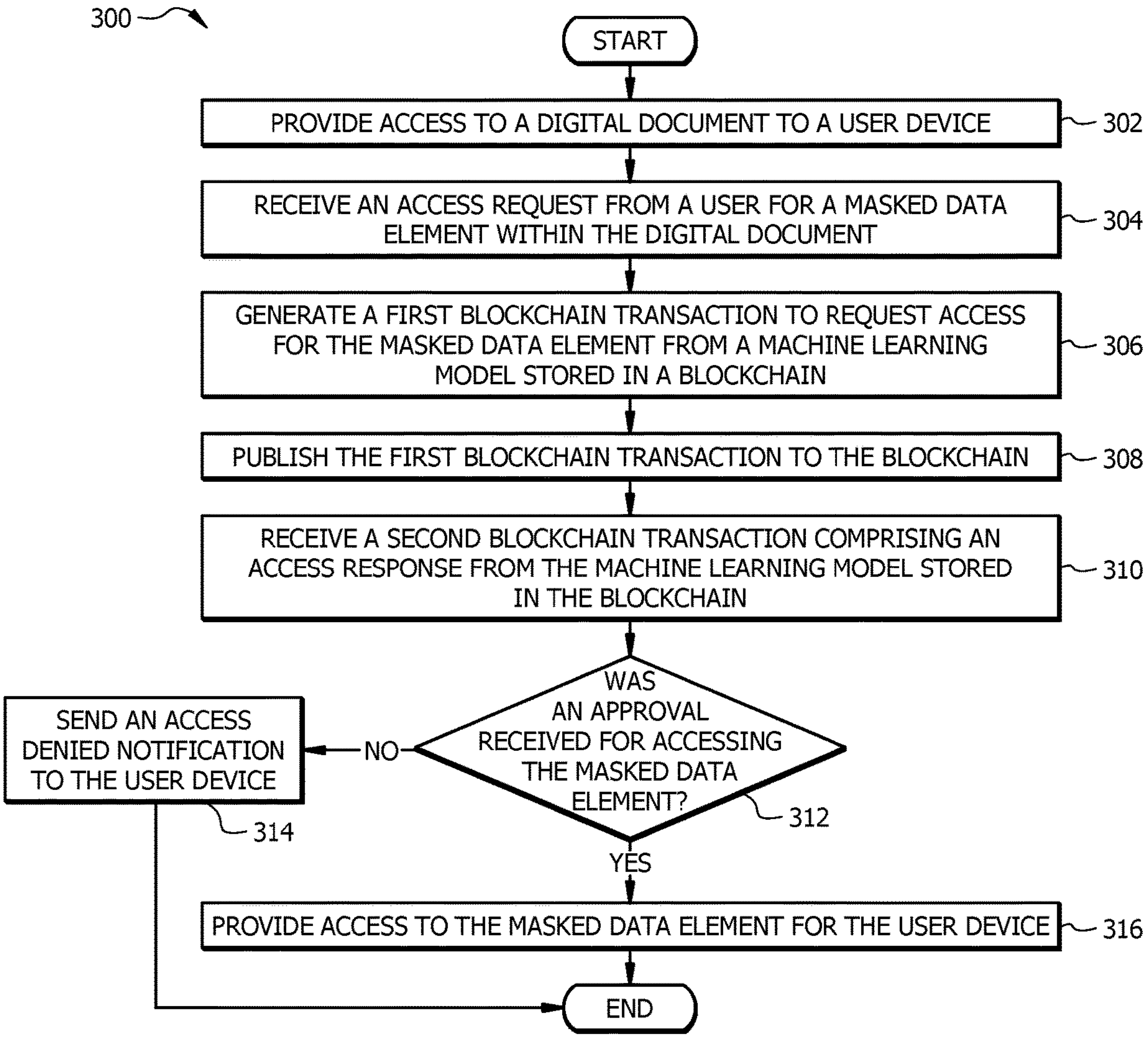
FIG. 3 is a flowchart of an embodiment of a data access control process for the information system.

FIG. 3 is a flowchart of an embodiment of a data access process 300 for the information system 100. The information system 100 may employ process 300 to provide access to digital documents 116 for a user device 104 and to allow a user associated with the user device 104 to request access to any masked data elements 404 within the digital document 116. In response to receiving a request to access a masked data element 404, the information system 100 will employ process 300 to generate a blockchain transaction 204 that identifies a user and the masked data element 404 and to publish the blockchain transaction 204 into a blockchain 114 that comprises a machine learning model 124 that is configured to determine whether the user is authorized to access the masked data element 404. Process 300 will then either grant or deny access to the masked data element 404 based on the response from the machine learning model 124. This process allows the information system 100 to dynamically determine whether a user is authorized to access masked data elements 404 based on various types of information that are associated with the user.

At step 302, the access control device 102 provides access to a digital document 116 from a user device 104. Here, the access control device 102 sends a digital document 116 to the user device 104 which allows a user to view, interact, and modify data elements 402 within the digital document 116. Examples of digital documents 116 include, but are not limited to, text files, tables, charts, presentations, images, files, documents, or any other suitable type of digital data. Referring to FIG. 4A as an example, the access control device 102 may send the user device 104 a digital document 116A that comprises a plurality of data elements 402. Examples of data elements 402 include, but are not limited to, text, numerical values, charts, graphs, images, audio samples, videos, or any other suitable type of data. In this example, the plurality of data elements 402 comprises alphanumeric values that are configured as a data table. In other examples, the digital document 116A may comprise data elements 402 that are configured in any other suitable type of data structure.

A masked data element 404 is a data element 402 that has values that are not visible or accessible to a user. For example, a masked data element 404 may be represented by obfuscating or encrypting the value of a data element 402 within a digital document 116. As another example, a masked data element 404 may be represented by hiding or removing the value of a data element 402 within a digital document 116. As another example, a masked data element 404 may be represented by covering the value of a data element 402 within a digital document 116. In other examples, a masked data element 404 may be represented using any other suitable technique to hiding the value of a data element 402 within the digital document 116 from a user. In the example shown in FIG. 4A, the digital document 116A comprises a first masked data element 404A that corresponds with a first score value, a second masked data element 404B that corresponds with a first code value, a third masked data element 404C that corresponds with a second score value, and a fourth masked data element 404D that corresponds with a second code value. In other examples, a digital document 116 may comprise any suitable number of masked data elements 404.

Returning to FIG. 3 at step 304, the access control device 102 receives an access request 118 from a user for a masked data element 404 within the digital document 116. In one embodiment, the user may generate the access request 118 by identifying or interacting with a masked data element 404. As an example, the user may identify a masked data element 404 by selecting or clicking on the masked data element 404 within the digital document 116. As another example, when the user device 104 is an augmented reality device 104A, the user may identify a masked data element 404 by using a voice command or gesture to identify the masked data element 404 within the digital document 116. For instance, the user may use a hand gesture to touch the masked data element in a virtual environment to identify the masked data element 404. In other examples, the user may use any other suitable technique to identify a masked data element 404 on their user device 104.

After the user identifies one or more masked data elements 404, the user device 104 then generates an access request 118. The access request 118 comprises one or more masked data element identifiers and a user identifier. Each masked data element identifier identifies a masked data element 404 from the digital document 116. The masked data element identifier may comprise an alphanumeric identifier, a data field name, a data field location, or any other suitable type of identifier that uniquely identifies a masked data element 404 in the digital document 116. The user identifier uniquely identifies the user. Examples of user identifiers include, but are not limited to, a name, an alphanumeric code, an employee number, an account number, a phone number, an email address, or any other suitable type of identifier that is uniquely associated with the user. The access request 118 may further comprise a digital document identifier or any other suitable type of information. After generating the access request 118, the user device 104 sends the access request 118 to the access control device 102.

At step 306, the access control device 102 generates a first blockchain transaction 204 to request access for a data element 402 that is associated with the masked data element 404. The first blockchain transaction 204 comprises the masked data element identifiers, the user identifier, and a machine learning model identifier. The machine learning model identifier identifies the machine learning model 124 that is stored in the blockchain 114. The machine learning model identifier may comprise a blockchain address, a name, an alphanumeric identifier, or any other suitable type of identifier that identifies the machine learning model 124 or the location of the machine learning model 124 in the blockchain 114.

At step 308, the access control device 102 publishes the first blockchain transaction 204 to the blockchain 114. Publishing the first blockchain transaction 204 makes the masked data element identifiers and the user identifier accessible to the machine learning model 124 via the blockchain 114.

At step 310, the access control device 102 receives a second blockchain transaction 204 from the machine learning model 124 that is stored in the blockchain 114. The second blockchain transaction 204 comprises an access response 120 that indicates whether the user is approved for accessing the masked data element 404. An example of an access response 120 is shown in FIG. 4B. The machine learning model 124 may be configured to extract the masked data element identifiers and the user identifier from the first blockchain transaction 204 and to determine whether the user is approved for accessing the masked data element 404 based on any suitable type or combination of information that is associated with the user. In some embodiments, the machine learning model 124 is configured to determine whether the user is approved for accessing the masked data element 404 based at least in part on the user behavior history that is associated with the user. For example, the machine learning model 124 may be configured to request or obtain a user behavior history that is associated with the user identifier that was published in the first blockchain transaction 204. The user behavior information may comprise a network resource usage history, a device usage history, a physical location access history, an Internet browsing history, a document usage history, security violation history, a work history, or any other suitable type of record for the behavior of the user. In this example, the machine learning model 124 uses the masked data element identifiers and information from the user behavior information as inputs and outputs an access response 120 based on the inputs.

In some embodiments, the machine learning model 124 is configured to determine whether the user is approved for accessing the masked data element 404 based at least in part on a group that is associated with the user. For example, the machine learning model 124 may be configured to request or obtain a user profile that identifies one or more groups, teams, or departments within an organization that the user is a member of. In this example, the machine learning model 124 uses the masked data element identifiers and one or more group identifiers as inputs and outputs an access response 120 based on the inputs.

In some embodiments, the machine learning model 124 is configured to determine whether the user is approved for accessing the masked data element 404 based at least in part on the behavior history for a group that is associated with the user. For example, the machine learning model 124 may be configured to request or obtain a group profile for a group that is associated with the user. The group profile comprises a behavior history for members of the group. The behavior information may comprise a network resource usage history, a device usage history, a physical location access history, an Internet browsing history, a document usage history, security violation history, a work history, or any other suitable type of record for the behavior of the members of the group. In this example, the machine learning model 124 uses the masked data element identifiers and information from the group behavior information as inputs and outputs an access response 120 based on the inputs.

After generating the access response 120, the machine learning model 124 publishes the access response 120 as a second blockchain transaction 204 in the blockchain 114. Publishing the second blockchain transaction 204 makes the access response 120 accessible to the access control device 102 via the blockchain 114.

At step 312, the access control device 102 determines whether an approval was received for accessing the data element 402 that is associated with the masked data element 404. The access response 120 may identify each masked data element 404 that the user requested access to and a corresponding approval status that indicates whether the user is approved to access the masked data elements 404. Here, the access control device 102 reviews the access response 120 to determine whether the access response 120 indicates that the user is approved to access a requested masked data element 404.

The access control device 102 proceeds to step 314 in response to determining that an approval was not received for accessing the data element 402 that is associated with the masked data element 404. In this case, the access control device 102 notifies the user that their request has been denied. At step 314, the access control device 102 sends an access denied notification 122 to the user device 104. The access denied notification 122 informs the user that their request for access to the masked data element 404 has been denied. In some embodiments, the access denied notification 122 may provide details about why the request was denied. In some embodiments, the access denied notification 122 may also indicate that the user should request access from an administrator (e.g. information technology staff or a manager) of the information system 100. In some instances, the denied notification 122 may indicate that the machine learning model 124 was unable to make a determination and that the machine learning model 124 has forwarded the request to an appropriate administrator for approval. In other examples, the denied notification 122 may comprise any other suitable type of information for the user. The access control device 102 may send the access denied notification 122 as an application pop-up notification, an email, or using any other suitable messaging technique.

Returning to step 312, the access control device 102 proceeds to step 316 in response to determining that an approval was received for accessing the data element 402 that is associated with the masked data element 404. In this case, the access control device 102 will update the digital document 116 and/or modify permission settings for the user device 104 to allow the user to view the data element 402 that is associated with the masked data element 404. At step 316, the access control device 102 provides access to the data element 402 that is associated with the masked data element 404 for the user device 104. In one embodiment, the access control device 102 may update or refresh the digital document 116 to provide access to the masked data element 404 for the user. In some embodiment, the access control device 102 may provide access to the masked data element 404 for the user device 104 by executing machine-executable instructions 406 that are provided by the machine learning model 124. For example, the access response comprises machine-executable instructions 406 for modifying the digital document 116 to provide access to the masked data element 404 for the user. As another example, the access response comprises machine-executable instructions 406 for modifying permission settings on the user device 104 to provide access to the masked data element 404 for the user. The permission settings may comprise network settings, security settings, hardware settings, software settings, any other suitable type or combination of settings for the user device 104. In other examples, the access response may comprise any other suitable type of machine-executable instructions 406 to provide access to the masked data element 404 for the user.

Referring to FIG. 4B as an example, the access control device 102 updates the digital document 116A that was shown in FIG. 4A by allowing the user to view the data elements 402 that were previously associated with masked data elements 404A and 404B. In this example, the user is still unable to view the data elements 402 that are associated with the masked data elements 404C and 404D.

Hardware Configuration for the Access Control Device

Figure 5:
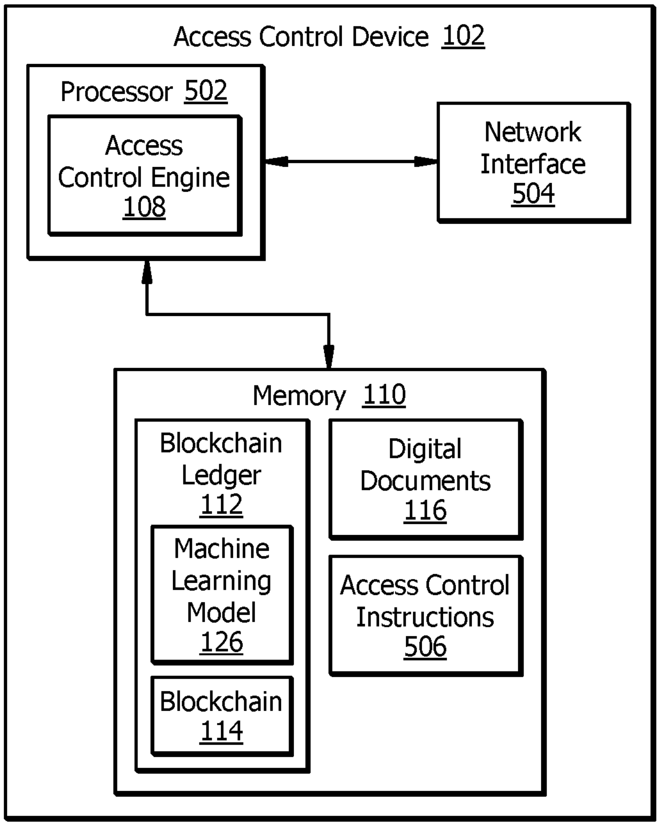
FIG. 5 is an embodiment of an access control device for the information system.

FIG. 5 is an embodiment of an access control device 102 for the information system 100. As an example, the access control device 102 may be a server or a computer. The access control device 102 comprises a processor 502, a memory 110, and a network interface 504. The access control device 102 may be configured as shown or in any other suitable configuration.

Processor

The processor 502 is a hardware device that comprises one or more processors operably coupled to the memory 110. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 110 and the network interface 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute access control instructions 506 to implement the access control engine 108. In this way, processor 502 may be a special-purpose computer designed to implement the functions disclosed herein. In an embodiment, the access control engine 108 is implemented using logic units, FPGAs, ASICs, DSPs, or any other suitable hardware. The access control engine 108 is configured to operate as described in FIGS. 1 and 3. For example, the access control engine 108 may be configured to perform the steps of process 300 as described in FIG. 3.

Memory

The memory 110 is a hardware device that is operable to store any of the information described above with respect to FIGS. 1-4 along with any other data, instructions, logic, rules, or code operable to implement the function(s) described herein when executed by the processor 502. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store access control instructions 506, digital documents 116, blockchain ledgers 112, machine learning models 124, blockchains 114, and/or any other data or instructions. The access control instructions 506 may comprise any suitable set of instructions, logic, rules, or code operable to execute the access control engine 108. The digital documents 116, blockchain ledgers 112, machine learning models 124, and blockchains 114 are configured similar to the digital documents 116, blockchain ledgers 112, machine learning models 124, and blockchains 114 described in FIGS. 1-4, respectively.

Network Interface

The network interface 504 is a hardware device that is configured to enable wired and/or wireless communications. The network interface 504 is configured to communicate data between user devices 104 and other devices, systems, or domains. For example, the network interface 504 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 502 is configured to send and receive data using the network interface 504. The network interface 504 may be configured to use any suitable type of communication protocol as would be appreciated by one of ordinary skill in the art.

Augmented Reality Device Hardware Configuration

Figure 6:
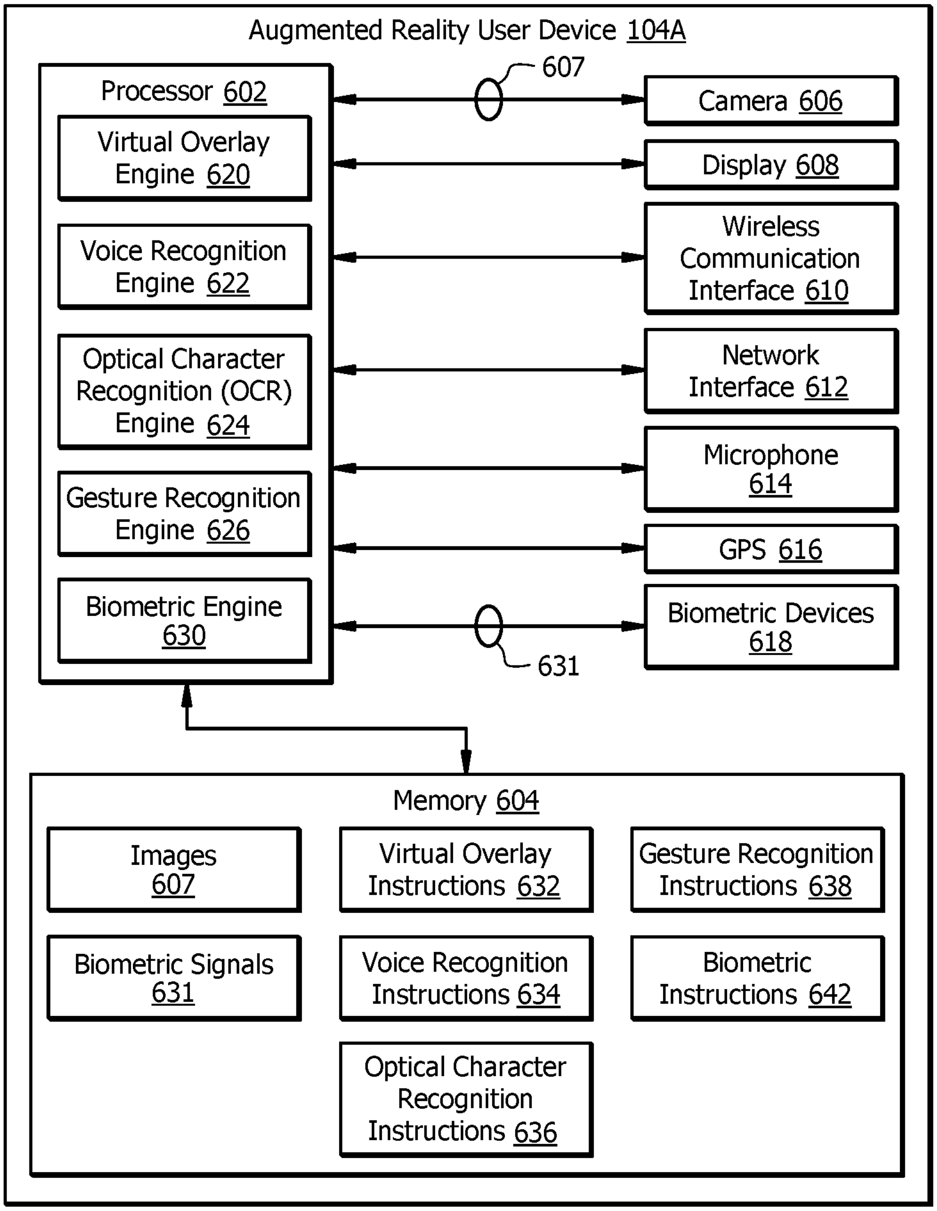
FIG. 6 is an embodiment of an augmented reality device for accessing the information system.

FIG. 6 is a schematic diagram of an embodiment of an augmented reality device 104A for accessing the information system 100. The augmented reality device 104A is configured to display digital documents 116 that comprise virtual objects overlaid onto one or more tangible objects in a real scene.

The augmented reality device 104A comprises a processor 602, a memory 604, a camera 606, a display 608, a wireless communication interface 610, a network interface 612, a microphone 614, a global position system (GPS) sensor 616, and one or more biometric devices 618. The augmented reality device 104A may be configured as shown or in any other suitable configuration. For example, augmented reality device 104A may comprise one or more additional components and/or one or more shown components may be omitted.

Camera

Examples of the camera 606 include, but are not limited to, charge-coupled device (CCD) cameras and complementary metal-oxide semiconductor (CMOS) cameras. The camera 606 is configured to capture images 607 of people, text, and objects within a real environment. The camera 606 is a hardware device that is configured to capture images 607 continuously, at predetermined intervals, or on-demand. For example, the camera 606 is configured to receive a command from a user to capture an image 607. In another example, the camera 606 is configured to continuously capture images 607 to form a video stream of images 607. The camera 606 is operable coupled to an optical character (OCR) recognition engine 624 and/or the gesture recognition engine 626 and provides images 607 to the OCR recognition engine 624 and/or the gesture recognition engine 626 for processing, for example, to identify gestures, text, and/or objects in front of the user.

Display

The display 608 is a hardware device that is configured to present visual information to a user in an augmented reality environment that overlays virtual or graphical objects onto tangible objects in a real scene in real-time. In an embodiment, the display 608 is a wearable optical head-mounted display configured to reflect projected images and allows a user to see through the display. For example, the display 608 may comprise display units, lens, semi-transparent mirrors embedded in an eyeglass structure, a visor structure, or a helmet structure. Examples of display units include, but are not limited to, a cathode ray tube (CRT) display, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, the display 608 is a graphical display on a user device. For example, the graphical display may be the display of a tablet or smartphone configured to display an augmented reality environment with virtual or graphical objects overlaid onto tangible objects in a real scene in real-time.

Wireless Communication Interface

Examples of the wireless communication interface 610 include, but are not limited to, a Bluetooth interface, a radio frequency identifier (RFID) interface, a near-field communication (NFC) interface, a LAN interface, a PAN interface, a WAN interface, a Wi-Fi interface, a ZigBee interface, or any other suitable wireless communication interface as would be appreciated by one of ordinary skill in the art upon viewing this disclosure. The wireless communication interface 610 is a hardware device that is configured to allow the processor 602 to communicate with other devices. For example, the wireless communication interface 610 is configured to allow the processor 602 to send and receive signals with other devices for the user (e.g. a mobile phone) and/or with devices for other people. The wireless communication interface 610 is configured to employ any suitable communication protocol.

Network Interface

The network interface 612 is a hardware device that is configured to enable wired and/or wireless communications and to communicate data through a network, system, and/or domain. For example, the network interface 612 is configured for communication with a modem, a switch, a router, a bridge, a server, or a client. The processor 602 is configured to receive data using network interface 612 from a network or a remote source.

Microphone

Microphone 614 is a hardware device configured to capture audio signals (e.g. voice commands) from a user and/or other people near the user. The microphone 614 is configured to capture audio signals continuously, at predetermined intervals, or on-demand. The microphone 614 is operably coupled to the voice recognition engine 622 and provides captured audio signals to the voice recognition engine 622 for processing, for example, to identify a voice command from the user.

GPS Sensor

The GPS sensor 616 is a hardware device that is configured to capture and to provide geographical location information. For example, the GPS sensor 616 is configured to provide the geographic location of a user employing the augmented reality device 104A. The GPS sensor 616 is configured to provide the geographic location information as a relative geographic location or an absolute geographic location. The GPS sensor 616 provides the geographic location information using geographic coordinates (i.e. longitude and latitude) or any other suitable coordinate system.

Biometric Devices

Examples of biometric devices 618 include, but are not limited to, retina scanners and fingerprint scanners. Biometric devices 618 are hardware devices that are configured to capture information about a person's physical characteristics and to output a biometric signal 631 based on captured information. A biometric signal 631 is a signal that is uniquely linked to a person based on their physical characteristics. For example, a biometric device 618 may be configured to perform a retinal scan of the user's eye and to generate a biometric signal 631 for the user based on the retinal scan. As another example, a biometric device 618 is configured to perform a fingerprint scan of the user's finger and to generate a biometric signal 631 for the user based on the fingerprint scan. The biometric signal 631 is used by a biometric engine 630 to identify and/or authenticate a person.

Processor

The processor 602 is a hardware device that is implemented as one or more CPU chips, logic units, cores (e.g. a multi-core processor), FPGAs, ASICs, or DSPs. The processor 602 is communicatively coupled to and in signal communication with the memory 604, the camera 606, the display 608, the wireless communication interface 610, the network interface 612, the microphone 614, the GPS sensor 616, and the biometric devices 618. The processor 602 is configured to receive and transmit electrical signals among one or more of the memory 604, the camera 606, the display 608, the wireless communication interface 610, the network interface 612, the microphone 614, the GPS sensor 616, and the biometric devices 618. The electrical signals are used to send and receive data and/or to control or communicate with other devices. For example, the processor 602 transmits electrical signals to operate the camera 606. The processor 602 may be operably coupled to one or more other devices (not shown).

The processor 602 is configured to process data and may be configured to implement various instructions. For example, the processor 602 is configured to implement a virtual overlay engine 620, a voice recognition engine 622, an OCR recognition engine 624, a gesture recognition engine 626, and a biometric engine 630. In an embodiment, the virtual overlay engine 620, the voice recognition engine 622, the OCR recognition engine 624, the gesture recognition engine 626, and the biometric engine 630 are implemented using logic units, FPGAs, ASICs, DSPs, or any other suitable hardware.

The virtual overlay engine 620 is configured to overlay virtual objects onto tangible objects in a real scene using the display 608. For example, the display 608 may be a head-mounted display that allows a user to simultaneously view tangible objects in a real scene and virtual objects. The virtual overlay engine 620 is configured to process data to be presented to a user as an augmented reality virtual object on the display 608.

The voice recognition engine 622 is configured to capture and/or identify voice patterns using the microphone 614. For example, the voice recognition engine 622 is configured to capture a voice signal from a person and to compare the captured voice signal to known voice patterns or commands to identify the person and/or commands provided by the person. For instance, the voice recognition engine 622 is configured to receive a voice signal to authenticate a user and/or to identify a selected option or an action indicated by the user.

The OCR recognition engine 624 is configured to identify objects, object features, text, and/or logos using images 607 or video streams created from a series of images 607. In one embodiment, the OCR recognition engine 624 is configured to identify objects and/or text within an image 607 captured by the camera 606. In another embodiment, the OCR recognition engine 624 is configured to identify objects and/or text in about real-time on a video stream captured by the camera 606 when the camera 606 is configured to continuously capture images 607. The OCR recognition engine 624 employs any suitable technique for implementing object and/or text recognition.

The gesture recognition engine 626 is configured to identify gestures performed by a user and/or other people. Examples of gestures include, but are not limited to, hand movements, hand positions, finger movements, head movements, and/or any other actions that provide a visual signal from a person. For example, gesture recognition engine 626 is configured to identify hand gestures provided by a user to indicate various commands such as a command to initiate a request for a data element associated with a masked data element in a digital document 116. The gesture recognition engine 626 employs any suitable technique for implementing gesture recognition.

The biometric engine 630 is configured to identify a person based on a biometric signal 631 generated from the person's physical characteristics. The biometric engine 630 employs one or more biometric devices 618 to identify a user based on one or more biometric signals 631. For example, the biometric engine 630 receives a biometric signal 631 from the biometric device 618 in response to a retinal scan of the user's eye and/or a fingerprint scan of the user's finger. The biometric engine 630 compares biometric signals 631 from the biometric device 618 to previously-stored biometric signals 631 for the user to authenticate the user. The biometric engine 630 authenticates the user when the biometric signals 631 from the biometric devices 618 substantially matches (e.g. is the same as) the previously stored biometric signals 631 for the user.

Memory

The memory 604 is a hardware device that comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise ROM, RAM, TCAM, DRAM, and SRAM. The memory 604 is operable to store images 607, virtual overlay instructions 632, voice recognition instructions 634, OCR recognition instructions 636, gesture recognition instructions 638, biometric instructions 642, and any other data or instructions.

Images 607 comprises images captured by the camera 606 and images 607 from other sources. In one embodiment, images 607 comprises images used by the augmented reality device 104A when performing optical character recognition. Images 607 can be captured using camera 606 or downloaded from another source such as a flash memory device or a remote server via an Internet connection.

Biometric signals 631 are signals or data that are generated by a biometric device 618 based on a person's physical characteristics. Biometric signals 631 are used by the augmented reality device 104A to identify and/or authenticate an augmented reality device 104A user by comparing biometric signals 631 captured by the biometric devices 618 with previously stored biometric signals 631.

The virtual overlay instructions 632, the voice recognition instructions 634, the OCR recognition instructions 636, the gesture recognition instructions 638, and the biometric instructions 642 each comprise any suitable set of instructions, logic, rules, or code operable to execute the virtual overlay engine 620, the voice recognition engine 622, the OCR recognition engine 624, the gesture recognition engine 626, and the biometric engine 630, respectively.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control device, comprising:

a memory operable to store a blockchain ledger comprising a plurality of blockchain transactions for a blockchain; and a processor operably coupled to the memory, configured to:

provide access to a digital document to a user device, wherein the digital document comprises:

a plurality of data elements; and one or more masked data elements, wherein each masked data element restricts access to a respective data element for a user;

receive an access request for a first masked data element, wherein the access request comprises a masked data element identifier for the first masked data element;

generate a first blockchain transaction, wherein the first blockchain transaction comprises:

the masked data element identifier for the first masked data element;

a user identifier for the user; and a machine learning model identifier fora machine learning model stored in the blockchain, wherein the machine learning model is configured to:

receive the masked data element identifier and the user identifier; and publish a second blockchain transaction in the blockchain ledger based at least in part on the masked data element identifier and the user identifier, wherein the second transaction comprises an access response indicating whether the user is approved for accessing the first masked data element;

publish the first blockchain transaction in the blockchain ledger;

receive the second blockchain transaction from the machine learning model stored in the blockchain in response to publishing the first blockchain transaction in the blockchain ledger;

determine the access response comprises an approval for the accessing the first masked data element; and provide access to the first masked data element on the user device for the user.

2. The device of claim 1, wherein:

the access response comprises machine-executable instructions for modifying the digital document to provide access to a corresponding data element associated with the first masked data element; and providing access to the first masked data element comprises executing the machine-executable instructions.

3. The device of claim 1, wherein:

the access response comprises machine-executable instructions for modifying permission settings on the user device for the user; and providing access to the first masked data element comprises executing the machine-executable instructions.

4. The device of claim 1, wherein:

the machine learning model is configured to obtain user behavior history for the user; and publishing the second blockchain transaction in the blockchain ledger is based at least in part on the user behavior history for the user.

5. The device of claim 1, wherein:

the machine learning model is configured to obtain a group identifier for a group associated with the user; and publishing the second blockchain transaction in the blockchain ledger is based at least in part on the group identifier.

6. The device of claim 1, wherein:

the machine learning model is configured to obtain a group profile for the user comprising behavior history for a group associated with the user; and publishing the second blockchain transaction in the blockchain ledger is based at least in part on the behavior history for the group associated with the user.

7. The device of claim 1, wherein the user device is an augmented reality device.

8. A data access control method, comprising:

providing access to a digital document to a user device, wherein the digital document comprises:

a plurality of data elements; and one or more masked data elements, wherein each masked data element restricts access to a respective data element for a user;

receiving an access request for a first masked data element, wherein the access request comprises a masked data element identifier for the first masked data element;

generating a first blockchain transaction, wherein the first blockchain transaction comprises:

the masked data element identifier for the first masked data element;

a user identifier for the user; and a machine learning model identifier fora machine learning model stored in a blockchain, wherein the machine learning model is configured to:

receive the masked data element identifier and the user identifier; and publish a second blockchain transaction in a blockchain ledger based at least in part on the masked data element identifier and the user identifier, wherein the second blockchain transaction comprises an access response indicating whether the user is approved for accessing the first masked data element;

publishing the first blockchain transaction in the blockchain ledger comprising a plurality of blockchain transactions for the blockchain;

receiving the second blockchain transaction from the machine learning model stored in the blockchain in response to publishing the first blockchain transaction in the blockchain ledger;

determining the access response comprises an approval for the accessing the first masked data element; and providing access to the first masked data element on the user device for the user.

9. The method of claim 8, wherein:

the access response comprises machine-executable instructions for modifying the digital document to provide access to a corresponding data element associated with the first masked data element; and providing access to the first masked data element comprises executing the machine-executable instructions.

10. The method of claim 8, wherein:

the access response comprises machine-executable instructions for modifying permission settings on the user device for the user; and providing access to the first masked data element comprises executing the machine-executable instructions.

11. The method of claim 8, further comprising:

obtaining, by the machine learning model, user behavior history for the user; and wherein publishing the second blockchain transaction in the blockchain ledger is based at least in part on the user behavior history for the user.

12. The method of claim 8, further comprising:

obtaining, by the machine learning model, a group identifier for a group associated with the user; and wherein publishing the second blockchain transaction in the blockchain ledger is based at least in part on the group identifier.

13. The method of claim 8, further comprising:

obtaining, by the machine learning model, a group profile for the user comprising behavior history for a group associated with the user; and wherein publishing the second blockchain transaction in the blockchain ledger is based at least in part on the behavior history for the group associated with the user.

14. The method of claim 8, wherein the user device is an augmented reality device.

15. A computer program product comprising executable instructions stored in anon-transitory computer-readable medium that when executed by a processor causes the processor to:

provide access to a digital document to a user device, wherein the digital document comprises:

a plurality of data elements; and one or more masked data elements, wherein each masked data element restricts access to a respective data element for a user;

receive an access request for a first masked data element, wherein the access request comprises a masked data element identifier for the first masked data element;

generate a first blockchain transaction, wherein the first blockchain transaction comprises:

the masked data element identifier for the first masked data element;

a user identifier for the user; and a machine learning model identifier for a machine learning model stored in a blockchain, wherein the machine learning model is configured to:

receive the masked data element identifier and the user identifier; and publish a second blockchain transaction in a blockchain ledger based at least in part on the masked data element identifier and the user identifier, wherein the second transaction comprises an access response indicating whether the user is approved for accessing the first masked data element;

publish the first blockchain transaction in the blockchain ledger comprising a plurality of blockchain transactions for the blockchain;

receive the second blockchain transaction from the machine learning model stored in the blockchain in response to publishing the first blockchain transaction in the blockchain ledger;

determine the access response comprises an approval for the accessing the first masked data element; and provide access to the first masked data element on the user device for the user.

16. The computer program product of claim 15, wherein:

the access response comprises machine-executable instructions for modifying the digital document to provide access to a corresponding data element associated with the first masked data element; and providing access to the first masked data element comprises executing the machine-executable instructions.

17. The computer program product of claim 15, wherein:

the access response comprises machine-executable instructions for modifying permission settings on the user device for the user; and providing access to the first masked data element comprises executing the machine-executable instructions.

18. The computer program product of claim 15, wherein publishing the second blockchain transaction in the blockchain ledger is based at least in part on a user behavior history for the user.

19. The computer program product of claim 15, wherein publishing the second blockchain transaction in the blockchain ledger is based at least in part on a group identifier associated with the user.

20. The computer program product of claim 15, wherein:

publishing the second blockchain transaction in the blockchain ledger is based at least in part on a behavior history for a group associated with the user; and the group profile comprises the behavior history for the group associated with the user.

* * * * *